US008364505B1

(12) United States Patent
Kane et al.

(10) Patent No.: US 8,364,505 B1
(45) Date of Patent: Jan. 29, 2013

(54) SYSTEMS AND METHODS FOR EARLY IDENTIFICATION OF A TOTAL LOSS VEHICLE

(75) Inventors: Michael Sinclair Kane, Bartlett, IL (US); Alan D. Galant, Grayslake, IL (US); Angela K. Woirol, Gurnee, IL (US)

(73) Assignee: Allstate Insurance Company, Northbrook, IL (US)

( * ) Notice: Subject to any disclaimer, the term of this patent is extended or adjusted under 35 U.S.C. 154(b) by 2080 days.

(21) Appl. No.: 11/014,808

(22) Filed: Dec. 20, 2004

Related U.S. Application Data

(60) Provisional application No. 60/540,555, filed on Feb. 2, 2004.

(51) Int. Cl.
*G06Q 40/00* (2012.01)
(52) U.S. Cl. .......................................... 705/4; 705/400
(58) Field of Classification Search ................ 705/2–4, 705/400; 701/29
See application file for complete search history.

(56) References Cited

U.S. PATENT DOCUMENTS

| 5,680,328 | A | * | 10/1997 | Skorupski et al. ............. 701/35 |
| 5,950,169 | A | * | 9/1999 | Borghesi et al. .................. 705/4 |
| 6,052,631 | A | * | 4/2000 | Busch et al. ..................... 701/29 |
| 2001/0005217 | A1 | * | 6/2001 | Hamilton et al. ............. 348/148 |
| 2002/0035488 | A1 | | 3/2002 | Aquila et al. |
| 2002/0103622 | A1 | * | 8/2002 | Burge ........................... 702/183 |

OTHER PUBLICATIONS

Accident Report Form, Lousiana State Driver Safety Program, Rev. Dec. 1998.*
U.S. Office Action in U.S. Appl. No. 12/620,974 mailed Sep. 20, 2011.

* cited by examiner

*Primary Examiner* — Sind Phongsvirajati
(74) *Attorney, Agent, or Firm* — Banner & Witcoff

(57) ABSTRACT

Systems and methods implement a rules-based decision engine that identifies vehicles with a high total loss potential based on vehicle details and damage information. This can be done by applying weights to the various criteria and comparing a sum of the applied weights to a threshold. An update mode allows for the subsequent update of the determination of whether the vehicle is a likely total loss based on additionally acquired information.

20 Claims, 3 Drawing Sheets

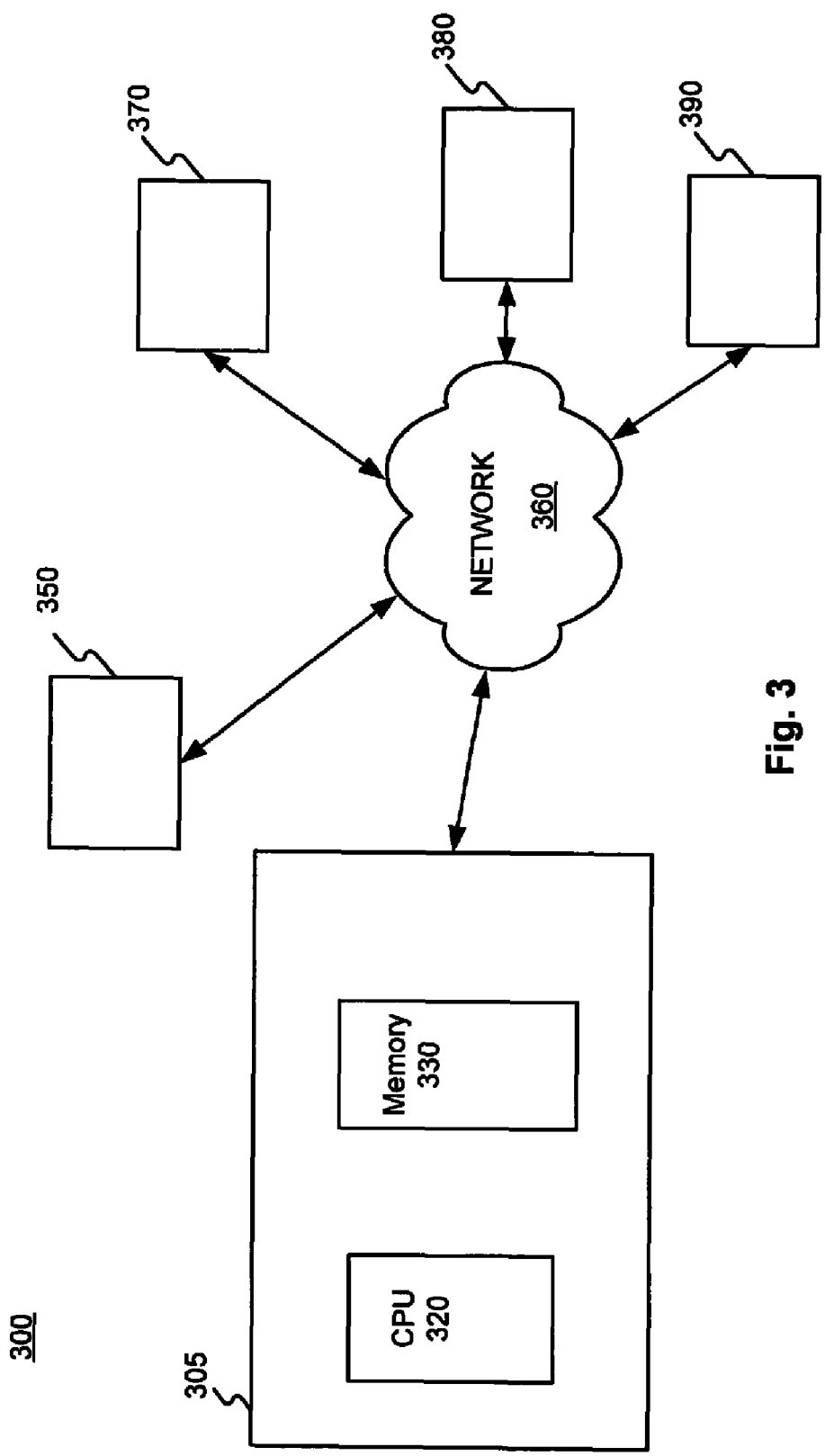

SYSTEMS AND METHODS FOR EARLY IDENTIFICATION OF A TOTAL LOSS VEHICLE

RELATED APPLICATION

This application claims the benefit of priority from U.S. Provisional Application No. 60/540,555, entitled "Systems and Methods for Early Identification of a Total Loss Vehicle" filed Feb. 2, 2004, the disclosure of which is expressly incorporated herein by reference in its entirety.

TECHNICAL FIELD

The present invention relates generally to systems and methods for early identification of a likely total loss vehicle, and more particularly, to automatically determining at an early stage whether an insured vehicle is beyond repair.

BACKGROUND

When a vehicle has been involved in an incident, a claims adjuster typically inspects the vehicle in the field. The inspection, however, may not occur for several days after the accident has been reported to the insurance company.

If the adjuster determines that the cost to repair the vehicle comes close to or exceeds the cash value of the vehicle, the adjuster deems the vehicle a total loss. He then works with the vehicle owner to reach a settlement, and secures the required paper work so the insurance company will issue payment to the owner for the loss. This process is often time consuming and expensive. Furthermore, the length of time spent may decrease the customer's satisfaction with the level of service provided by the insurance company.

One reason for the length of time spent in this process is that the insurance company does not know the extent of damage to the vehicle until an adjuster can inspect the vehicle, and the adjuster may be unable to do so immediately. Upon learning that a vehicle has been damaged or involved in an accident, the insurance company normally assigns the vehicle to a repair shop or to an adjuster that will inspect the vehicle at a location agreed to by the insured. The inspection may occur days or weeks after the vehicle is in the repair shop or storage lot. In addition, this conventional procedure may cause the insurance company to incur storage and other operation costs, such as the cost to transport the vehicle.

SUMMARY

Consistent with the present invention, a method is provided for identifying a likely total loss vehicle. The method comprises: receiving data for criteria that describe the condition of a vehicle; analyzing the data using a data processor to determine whether the data meets a threshold of likelihood of total loss; and generating a notification if the data meets the threshold.

Also consistent with the present invention, a system is provided for identifying a likely total loss vehicle. The system comprises: a network; a server coupled to the network that receives data for criteria that describe the condition of a vehicle; and a decision engine running on the server to analyze the data received for the criteria to determine whether the data meets a threshold of likelihood of total loss, and to generate a notification if the data meets the threshold.

Both the foregoing general description and the following detailed description are exemplary and explanatory only, and do not restrict the scope of the invention. Embodiments consistent with the invention may include features in addition to or different from those set forth in the following description.

BRIEF DESCRIPTION OF THE DRAWINGS

The accompanying drawings, which are incorporated in and constitute a part of this specification, illustrate embodiments consistent with the invention and, together with the description, explain the principles of the invention. In the drawings:

FIG. 3 is a diagram of an exemplary system to implement the steps described in FIGS. 1 and 2.

DESCRIPTION OF THE EMBODIMENTS

Reference will now be made in detail to exemplary embodiments consistent with the invention, examples of which are illustrated in the accompanying drawings. Wherever possible, the same reference numbers in different drawings refer to the same or like parts.

Automating the collection of data for a loss report can provide an increased amount of data to describe the condition of a vehicle, thereby allowing an automated determination of whether the vehicle is likely a total loss. A loss report describes the extent of the damage to and identifying characteristics of the vehicle. The questions asked during the collection of data can be detailed and include follow up questions for more specific information. Increasing the number and specificity of the questions may improve the accuracy of the loss report and reduce the time needed to complete the loss report.

Figure 1:
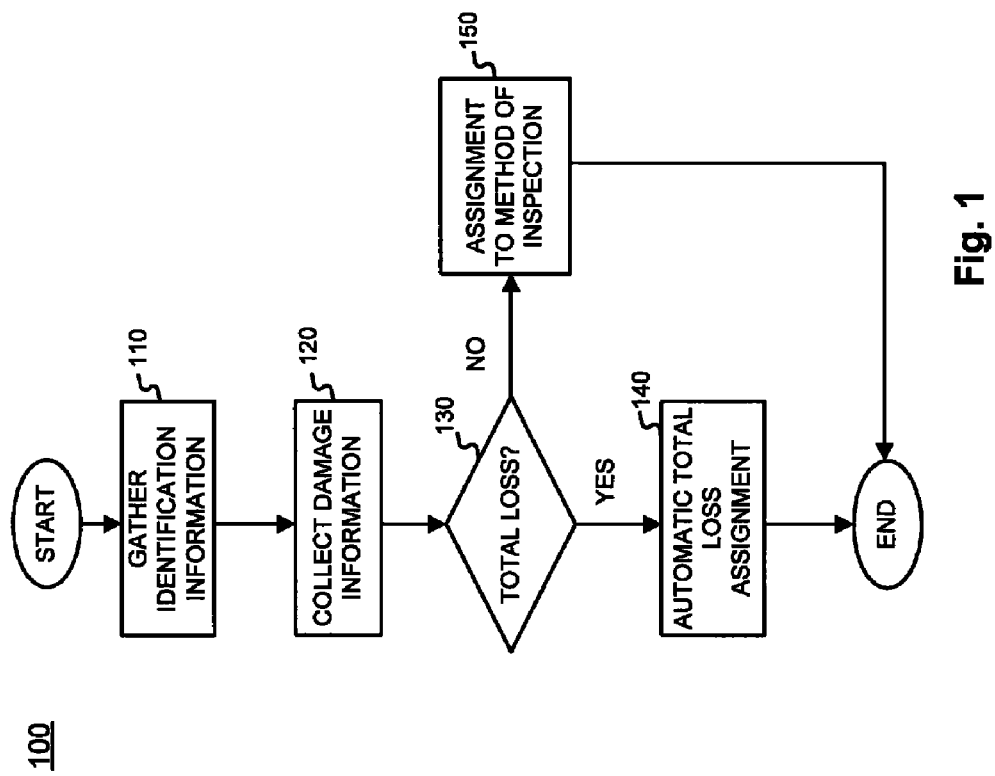
FIG. 1 is a flow diagram of steps taken, consistent with the invention, to determine whether a vehicle is a total loss.

FIG. 1 is a flow diagram 100 of steps to determine whether a vehicle is a total loss. The processing and determination described below may occur when an insurance company takes an initial loss report from the insured or other appropriate person. Although the following description sets forth an entirely automated system, one or more of the stages may take place completely or partially manually. Furthermore, although the following example describes processing a vehicle insured by the company taking the loss report, it need not be so limited. For example, the vehicle may be insured by another insurance company or might not be insured.

First, a customer service representative gathers identification information about the insured, such as the insured's name and policy number, and may verify identification information describing the damaged vehicle. Step 110. Certain information gathered for the loss report, such as the make, model, and year of the vehicle can be retrieved from a database storing the policy data. That information can be verified and updated when the customer service representative interacts with the insured. Any information not available can be requested from the insured.

Next, the customer service representative gathers information concerning the damage to an insured vehicle to complete a loss report. Step 120. The information can come from the insured over the telephone, via the Internet or in person, or by any means. In a web-based system, an insured may directly input data describing the extent of damage to a vehicle over the Internet. In such an embodiment, an insured may bypass interacting with a customer service representative to submit the data for a loss report. Data describing the condition of the vehicle may include whether the vehicle rolled over, whether the vehicle had multiple impact points, etc. Data describing characteristics of the vehicle may include whether the vehicle is over a certain age or has been driven over a certain number of miles.

The automated nature of this loss report processing reduces the chance a customer service representative will ask unnecessary questions. On the other hand, the system may determine that it is necessary to ask a follow-up question based on one or more answers already received. The decision engine can thus prompt more detailed questions only when necessary.

For example, rollover questions are enabled based on loss facts. If the loss report noted that the doors are damaged, then answering "no" to a question such as "Do all doors open freely?" enables the question "Was rescue equipment used to free occupants from the vehicle?" As another example, if the front end of a vehicle has sustained damage to the hood, grille and front bumper, then a question asking "Were there any fluids leaking?" is enabled. In some implementations consistent with the present invention, an answer may be required before the process continues, but all embodiments may not require answers in all situations.

During the information collection process, a graphical user interface may allow a customer service representative to use a pointing device to click on an area of a graphic of a vehicle to select a damaged area. For example, by clicking on a door on the graphic of the vehicle may select the door as a damaged area.

Next, a decision engine (described in greater detail below) uses the information to determine whether the vehicle is likely a total loss by applying a set of rules (described in greater detail below). Step 130. The decision engine automatically determines whether to make a total loss assignment for the vehicle. If so, a total loss assignment is made, and a notification is automatically generated and transmitted to appropriate persons, such as total loss experts. Step 140. The total loss experts may then arrange to have the vehicle moved to an inspection station where an adjuster may then inspect the vehicle, or take some other action.

If the decision engine does not determine that the vehicle is likely a total loss, then the customer service representative assigns the vehicle to a particular method of inspection. Step 150. Methods of inspection may include assigning the vehicle to a field location, assigning the vehicle to a drive-in location if the vehicle is determined drivable, or assigning the vehicle to a repair shop based on interaction with the customer and the customer's choice of a repair shop.

Figure 2:
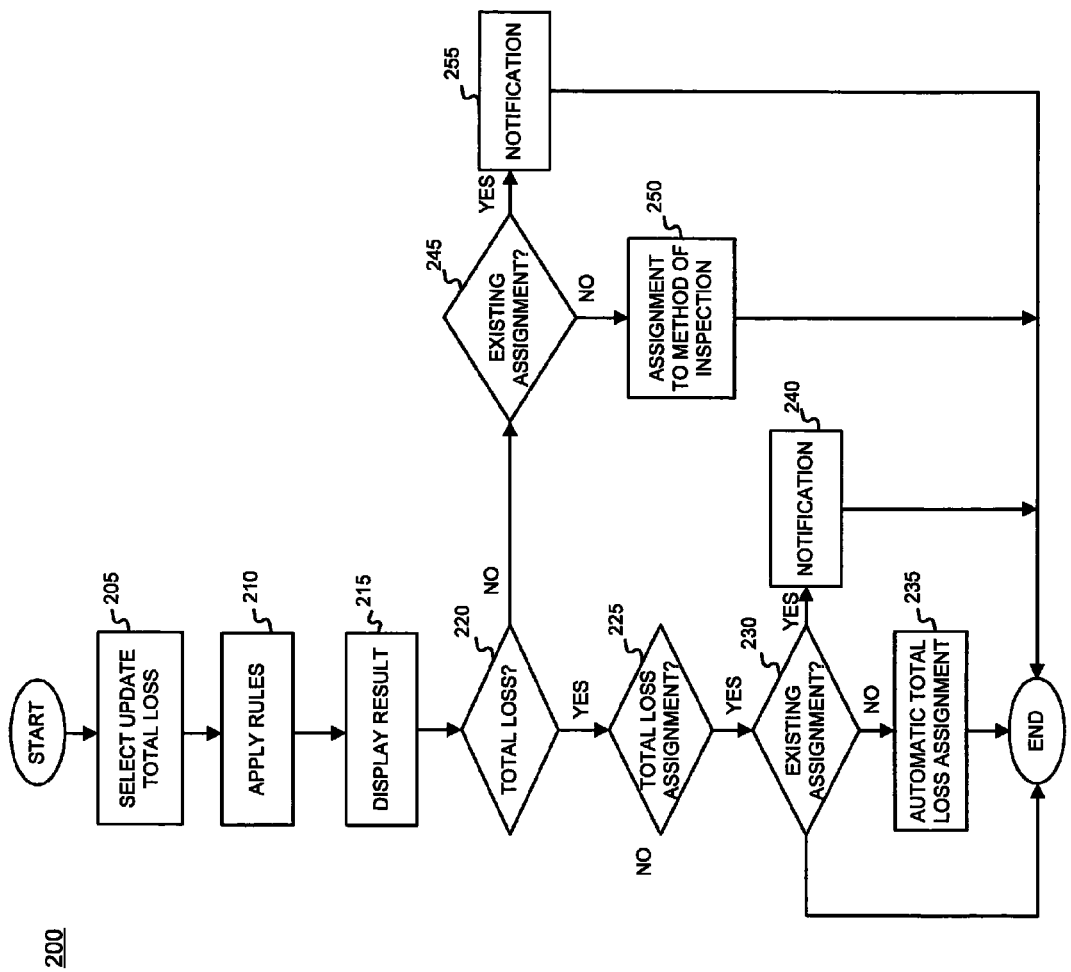
FIG. 2 is a flow diagram of steps taken, consistent with the invention, to determine whether a vehicle is a total loss using an update mode.

FIG. 2 is a flow diagram 200 of steps taken, consistent with the invention, to determine whether a vehicle is a total loss using an update mode. After completion of a loss report, or after having entered a loss report, a customer service representative can select a "check for total loss" button on a user interface to initiate the decision-engine rules. This functionality allows a customer service representative to update the analysis when more information is gathered subsequent to the initial report. Step 205. The form of such initiation is not important to the invention.

Next, the decision engine carries out a set of rules tied to the data in the loss report to determine the likelihood of a total loss of the vehicle. Step 210. The operation of the decision engine is well within the level of ordinary skill given the rules described below. In a preferred embodiment, if certain criteria are satisfied, then a weighted value is assigned to the criteria. For example, if the vehicle has been driven over 100,000 miles, then a weight of five is assigned to the criteria. The following list represents exemplary weight values that may be assigned to certain criteria used when the rules execute (as discussed in connection with FIGS. 1 and 2):

Vehicle Characteristics:
Vehicle >5 years old=10 points
Mileage of vehicle >100,000 miles=5 points
Vehicle Condition:
Vehicle not drivable=9 points
Tail light indicator damaged=5 points each
Multiple impact points=6 points
Windshield or cowl damage=12 points
Fluids leaking from vehicle=6 points
Roof of vehicle buckled=6 points
Rollover loss type=15 points
Airbags deployed=7 points
Rear glass damaged=12 points
All over side of vehicle damage=8 points
Seats/dash damaged=10 points
Occupant removal=14 points
Frame damaged=2 points
Death (insured vehicle)=5 points
Fire and Flood Losses:
Fire damage=10 points
Complete interior burned=15 points
Complete exterior burned=15 points
Complete engine burned=15 points
Flood damage=10 points
Water reached seats=8 points
Water reached dash=15 points
Engine submerged=15 points
Salt water=10 points These weights are exemplary, and one of skill in the art will recognize that more specific calculations may be made. For example, whether the insured vehicle is more than five years old may be replaced with a more specific calculation, for example calculating a weight using the current date of the loss report and the model year of the vehicle and assigning a point value based on the specific age of the vehicle. For example, if the vehicle is five years old, then five points may be assigned to the criteria. If the vehicle is six years old, then ten points may be assigned to the criteria.

The values of the weights may also vary based on the make, model, or class of a vehicle. For example, a different set of weights may be used depending on whether the insured vehicle is a sport utility vehicle, passenger vehicle, or truck. Further, it may be more desirable to exclude more expensive luxury or exotic vehicles from automated processing due to their high value, and instead require inspection by an adjuster. Additionally, it may be desirable to exclude motorcycles and catastrophic claims from automated processing, for example. Other examples of vehicles that might be excluded include campers, motor homes, and rented or borrowed vehicles.

It may be desirable to also exclude from automated processing certain types of losses, such as losses due to total or partial theft, vandalism, or losses involving glass only. For example, if a loss only involves glass damage, then it may be excluded from further processing. In addition, automated processing may also exclude certain losses if the insured does not have coverage for the loss. For example, if an insured does not have collision coverage or does not have comprehensive coverage, then it may not be necessary to proceed with the additional steps in the process.

For vehicles and claims that are not excluded, the weights that are used can be selected using many different methods. One is to use standard criteria and to apply weights based on experience gained from evaluating reports. Another method is to gather data from repair shops on costs of repair and form weights from such data. Still other methods include having an expert system that revises the weights (i.e., learns) based on determinations made by actual claims adjusters. The method used to determine the values assigned to the weights is not critical to all aspects of this invention.

The decision engine rules apply the weights to the data and calculate the sum of all weighted criteria to determine whether a vehicle is likely a total loss based on a point threshold. For example, if the total of all weighted criteria is equal to or greater than twenty-five, then the vehicle is deemed a probable total loss.

After the decision engine finishes the determination, it displays a message on a user interface indicating the result. Step 215. Possible results include (1) the vehicle is likely a total loss; (2) the vehicle is likely not a total loss, (3) a determination could not be made; or (4) the decision engine could not run the rules, preferably with an explanation for any error. The form of this notification, which is not critical to this invention, can be by an e-mail message, a printed message, or any other acceptable form of communication.

Whether the decision engine continues processing depends on whether the vehicle has been determined a likely total loss. Step 220. If so, upon receiving a notification that the vehicle is a likely total loss, the claims handler may be given the option to make a total loss assignment of the vehicle. The claims handler may decide whether to make a total loss assignment. Step 225. If so, a determination is made whether the vehicle has previously been assigned to a method of inspection. Step 230. If so, the decision engine generates and transmits to the claims handler a notification of the preexisting assignment. Step 240. Otherwise, the decision engine will automatically make the assignment by generating a notification and transmitting it to appropriate persons, such as total loss experts. Step 235.

If the decision engine determines that the vehicle is likely not a total loss or cannot make the determination (step 220), the decision engine determines whether the vehicle has previously been assigned to a method of inspection. Step 245. If so, the decision engine generates and transmits to the claims handler a notification of the preexisting assignment. Step 255. If not, the decision engine can then notify the customer representative to make an assignment for a method of inspection, such as to a field location, drive-in location, or repair shop. Step 250.

One of skill in the art will recognize that in various embodiments the decision engine may process or update a loss report automatically. For example, in a web-based system, selecting, generating, and transmitting an assignment for a particular method of inspection may occur automatically and without intervention by a claims handler when a vehicle is not determined a likely total loss.

Upon completion of an initial loss report (as discussed in connection with FIG. 1) or after updated processing (as discussed in connection with FIG. 2), the claims handler may then communicate the result to the insured. Alternatively, in a web-based system, the insured may receive an automatic notification of the result. In this way, the insured learns quickly whether a vehicle is deemed a probable total loss, thereby increasing customer satisfaction.

Additionally, due to the nature of the questions asked and the quantity of available questions, it is also possible to determine with greater accuracy whether a vehicle is a total loss. As a result, the insurance company saves unnecessary storage or repair costs, and saves the expense of sending a claims adjuster to assess the damage. In particular, the insurance company saves costs associated with furnishing the insured with a rental vehicle if the insured's policy includes rental coverage. And if the insured's policy does not include rental coverage, then the insured saves costs associated with renting a vehicle.

FIG. 3 is a diagram of an exemplary system 300, consistent with the invention, to implement the steps described above. System 300 includes a server 305, with a CPU 320 and a memory 330 connected to a network 360. Software in memory 330 preferably implements a program for determining whether a vehicle is likely a total loss. Network 360 provides communications between the various components in system 300, such as user terminals 370-390. Network 360 may be a shared, public, or private network and encompass a wide or local area.

Terminals 370-390 allow a user to send and/or receive information to/from server 305. Terminals 370-390 may be any type of appropriate device for communicating with server 305 over network 360. For example, terminal 370 may be a PDA running a program for communicating with server 305, while terminal 380 may be a desktop computer running a web browser for communicating with server 305 via the Internet. Optionally, terminal 390 may be a standard landline telephone or wireless phone.

An insured customer may access server 305 via network 360 or operate a web browser or software running on terminal 380. Data may be sent over network 360 to and from server 305 to terminal 380 during the processing of the loss report. Also, as explained above, an insured customer at terminal 390 operating as a telephone may contact a customer service representative at terminal 350. The customer service representative may make selections using software running on terminal 350, and may send data to and from server 305.

The foregoing descriptions have been presented for purposes of illustration and description. They are not exhaustive and do not limit the invention to the precise form disclosed. Modifications and variations are possible in light of the above teachings or may be acquired from practicing the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A computer-assisted method for identifying a likely total loss vehicle comprising:

prior to a physical inspection of a vehicle by an insurance provider to generate repair estimate data, receiving data originating from a customer describing events a vehicle went through by prompting a plurality of questions regarding the events the vehicle went through, and receiving a response to the plurality of questions;

a computing system applying non-monetary weights to the data based on the response to each question;

the computing system determining a cumulative value representing the non-monetary weights applied to the data;

the computing system analyzing the data using a data processor to determine whether the data meets a predetermined threshold value indicating a likelihood of total loss by comparing the cumulative value to the threshold and classifying the vehicle as a likely total loss if the cumulative value exceeds the threshold;

the computing system automatically generating a total loss assignment when the value exceeds the threshold;

the computing system electronically transmitting the total loss assignment to an entity corresponding to the total loss assignment;

the computing system selecting a method of inspection when the cumulative value does not meet the threshold;

the computing system automatically generating a method of inspection assignment when the cumulative value does not meet the threshold; and the computing system electronically transmitting the method of inspection assignment to an entity corresponding to the method of inspection assignment.

2. The method of claim 1, wherein the response to each question indicates one or more actions performed on the vehicle.

3. The method of claim 2, wherein a first predetermined value is assigned if the vehicle rolled over, and a second predetermined value is assigned if a person was cut out of the vehicle.

4. A computer-assisted method for identifying a likely total loss vehicle comprising:

prior to a physical inspection of a vehicle by an insurance provider to generate repair estimate data, receiving in a memory of a data processing system, data from a customer describing events the customer's vehicle went through;

the data processing system assigning non-monetary weights to the data stored in the memory;

the data processing system determining a cumulative value representing the non-monetary weights assigned to the data;

the data processing system comparing the cumulative value to a threshold value to determine whether the vehicle is a likely total loss; and the data processing system outputting a notification from the data processing system indicating the vehicle is a likely total loss when the data meets the threshold.

5. The method of claim 4, wherein receiving data includes:
prompting on a display at least one question regarding the condition of a vehicle; and
receiving user input providing a response to the at least one question.

6. The method of claim 5, further comprising:
prompting a follow up question based on the response.

7. The method of claim 4, further comprising:
the data processing system automatically generating a total loss assignment when the vehicle is a likely total loss; and
the data processing system electronically transmitting the total loss assignment to an entity corresponding to the total loss assignment.

8. The method of claim 4, further comprising:
the data processing system selecting a method of inspection when the data does not meet the threshold;
the data processing system automatically generating an assignment for a selected method of inspection; and
the data processing system electronically transmitting the assignment to an entity corresponding to the assignment.

9. The method of claim 4, wherein the data comprises one or more events the vehicle went through.

10. The method of claim 9, wherein the one or more events comprises the vehicle rolling over.

11. The method of claim 4, wherein the data comprises one or more actions performed on the vehicle.

12. The method of claim 11, wherein the one or more actions comprises a person being cut out of the vehicle.

13. A non-transitory computer readable storage media storing computer executable instructions that, when executed, perform a method for identifying a likely total loss vehicle, said method comprising:

prior to a physical inspection of a vehicle by an insurance provider to generate repair estimate data, inputting data received from a customer corresponding to damaging events the vehicle went through, into an automated system;

analyzing the data using the automated system to determine whether the data meets a threshold of a likelihood of total loss;

automatically generating a total loss assignment when the vehicle is a likely total loss; and transmitting the total loss assignment to an entity corresponding to the total loss assignment.

14. The computer readable storage media of claim 13, said method further comprising:
selecting a method of inspection when the data does not meet the threshold;
generating an assignment for a selected method of inspection; and
transmitting the assignment to an entity corresponding to the assignment.

15. The computer readable storage media of claim 13, wherein the data is received from a customer by:
prompting at least one question regarding the condition of a vehicle; and
receiving a response to the at least one question.

16. The computer readable storage media of claim 15, said method further comprising:
prompting a follow up question based on the response.

17. The computer readable storage media of claim 13, wherein the data comprises one or more events the vehicle went through.

18. The computer readable storage media of claim 17, wherein the one or more events comprises the vehicle rolling over.

19. The computer readable storage media of claim 13, wherein the data comprises one or more actions performed on the vehicle.

20. The computer readable storage media of claim 19, wherein the one or more actions comprises a person being cut out of the vehicle.

* * * * *